(12) United States Patent
Colliou et al.

(10) Patent No.: US 10,655,533 B2
(45) Date of Patent: May 19, 2020

(54) DEVICE BUILT INTO A CYLINDER HEAD FOR CONTROLLING AMOUNT OF AIR FED INTO THE INTAKE OF A TURBOCHARGED INTERNAL COMBUSTION ENGINE AND METHOD USING SUCH A DEVICE

(71) Applicant: IFP Energies nouvelles, Rueil-Malmaison (FR)

(72) Inventors: Thierry Colliou, Les Cotes d'Arey (FR); Bruno Walter, Chassagny (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/566,992

(22) PCT Filed: Apr. 12, 2016

(86) PCT No.: PCT/EP2016/057981
§ 371 (c)(1),
(2) Date: Oct. 16, 2017

(87) PCT Pub. No.: WO2016/166087
PCT Pub. Date: Oct. 20, 2016

(65) Prior Publication Data
US 2018/0128160 A1 May 10, 2018

(30) Foreign Application Priority Data

Apr. 16, 2015 (FR) ..................................... 15 53400

(51) Int. Cl.
*F02B 37/02* (2006.01)
*F02M 35/108* (2006.01)
(Continued)

(52) U.S. Cl.
CPC .......... *F02B 37/168* (2013.01); *F02B 37/025* (2013.01); *F02B 37/10* (2013.01); *F02M 35/108* (2013.01); *Y02T 10/144* (2013.01)

(58) Field of Classification Search
CPC ........ F02B 37/025; F02B 37/16; F02B 37/10; F02B 37/105; F02B 37/168; F02B 37/20;
(Continued)

(56) References Cited

U.S. PATENT DOCUMENTS

| 4,018,053 A | 4/1977 | Rudert et al. |
| 4,373,336 A * | 2/1983 | Horler ................... F02B 37/183 60/605.1 |

(Continued)

FOREIGN PATENT DOCUMENTS

| DE | 1526443 A1 | 9/1970 |
| DE | 2438162 A1 | 2/1976 |

(Continued)

OTHER PUBLICATIONS

International Search Report for PCT/EP2016/057981 dated Jun. 3, 2016; English translation submitted herewith (7 pages).

*Primary Examiner* — George C Jin
(74) *Attorney, Agent, or Firm* — Fitch, Even & Tabin & Flannery LLP

(57) ABSTRACT

The present invention relates to a device for controlling the amount of air fed into the intake of a charged internal combustion engine comprising two exhaust gas outlets (32, 36) which are each connected to an exhaust manifold (30, 34) of a group of at least one cylinder (12₁, 12₂, 12₃, 12₄). The device comprises a charging device (38) comprising a turbocompressor having a dual-inlet (46, 48) turbine (40) connected to the exhaust gas outlets and an external air compressor (44), and at least one duct for partially transferring compressed air from the compressor to the turbine inlets. According to the invention, the partial transfer duct (Continued)

(100, 102; 110, 112) is integrated into the cylinder head and comprises throttles (74, 76) controlling the circulation of compressed air in said duct.

9 Claims, 2 Drawing Sheets

(51) Int. Cl.
  *F02B 37/16* (2006.01)
  *F02B 37/10* (2006.01)

(58) Field of Classification Search
  CPC ..... F02B 37/166; F02B 37/183; F02M 23/00; F02M 26/43; F02M 26/05; F02M 26/20; F02M 26/41; F02M 35/10222; F02M 35/10163; F02M 35/108; F01N 3/34; F01N 3/30; F01N 3/32; F02F 1/38; F02F 1/4285
  See application file for complete search history.

(56) References Cited

U.S. PATENT DOCUMENTS

| | | | |
|---|---|---|---|
| 4,404,805 A | 9/1983 | Curtil | |
| 4,608,828 A * | 9/1986 | Mikota | F02B 33/44 123/79 R |
| 5,560,208 A * | 10/1996 | Halimi | F02B 37/025 60/600 |
| 5,690,081 A * | 11/1997 | Kwiatkowski | F01N 3/34 123/568.12 |
| 6,276,139 B1 * | 8/2001 | Moraal | F01N 3/023 60/605.2 |
| 2002/0004007 A1 * | 1/2002 | Doring | F02C 6/12 415/203 |
| 2009/0049835 A1 * | 2/2009 | Onodera | F02B 37/025 60/605.2 |
| 2016/0208680 A1 * | 7/2016 | McConville | F02B 37/183 |
| 2016/0281634 A1 * | 9/2016 | Wakiya | F02F 1/4264 |
| 2018/0171866 A1 * | 6/2018 | Colliou | F02B 37/025 |

FOREIGN PATENT DOCUMENTS

| | | |
|---|---|---|
| DE | 2750537 A1 | 5/1979 |
| DE | 2906182 A1 | 8/1980 |
| DE | 3311626 A1 | 10/1984 |
| DE | 19531875 C1 | 9/1996 |
| EP | 0701048 A1 | 3/1996 |
| FR | 2478736 A1 | 9/1981 |
| GB | 2438360 A | 11/2007 |
| JP | S57200618 A | 12/1982 |

* cited by examiner

DEVICE BUILT INTO A CYLINDER HEAD FOR CONTROLLING AMOUNT OF AIR FED INTO THE INTAKE OF A TURBOCHARGED INTERNAL COMBUSTION ENGINE AND METHOD USING SUCH A DEVICE

CROSS-REFERENCE TO RELATED APPLICATIONS

This application is a U.S. national phase application filed under 35 U.S.C. § 371 of International Application No. PCT/EP2016/057981, filed Apr. 12, 2016, designating the United States, which claims priority from French Patent Application No. 15/53.400, filed Apr. 16, 2015, which are hereby incorporated herein by reference in their entirety.

BACKGROUND OF THE INVENTION

Field of the Invention

The present invention relates to a device for controlling the amount of air fed into the intake of a turbocharged internal combustion engine, in particular a stationary engine or an engine for an automotive or industrial vehicle, and a method for controlling the quantity of air for such an engine. In particular, the majority of the elements of the device and in particular the various ducts are integrated into the cylinder head of the engine.

Description of the Prior Art

As is widely known, the power delivered by an internal combustion engine is dependent on the quantity of air introduced into the combustion chamber of the engine with the air quantity itself being proportional to the density of the air.

Thus, it is usual to increase the quantity of air by compressing the external air before it is introduced into the combustion chamber. This operation, which is called charging, may be performed by various devices such as a turbocompressor or a driven compressor, which may be centrifugal or volumetric.

In the case of charging by a turbocompressor, the latter comprises a rotating turbine with single or double flow, connected by a shaft to a rotating compressor. The exhaust gases from the engine pass through the turbine which is then driven in rotation. This rotation is then transmitted to the compressor which, by its rotation, compresses the external air before it is introduced into the combustion chamber.

As is best described in French patent application number 2 478 736, in order to significantly increase this quantity of compressed air in the combustion chamber of the engine, it is provided to further increase the compression of the external air by the compressor.

This is achieved more particularly by increasing the rotation speed of the turbine and hence of the compressor.

To do this, part of the compressed air leaving the compressor is diverted in order to be fed directly to the inlet of the turbine where it mixes with the exhaust gases. Then a large quantity of fluid (mixture of compressed air and exhaust gas) passes through the turbine, which allows an increase in the rotation speed of the turbine and consequently of the compressor. This increase in compressor speed then allows an increase in the pressure of the external air which will be compressed in this compressor and introduced into the combustion chamber of the engine.

In this way, the compressed air has a greater density, which allows an increase in the quantity of air contained in the combustion chamber.

This type of charged engine, although satisfactory, nonetheless has substantial drawbacks.

In fact the flow of compressed air fed to the inlet of the turbine is not correctly controlled, which can lead to a malfunction of the engine.

Thus for example, if too great a quantity of compressed air is diverted to the turbine inlet, the exhaust gases entering the turbine are cooled too greatly by this air, which leads to a reduction in the total efficiency of the charging.

SUMMARY OF THE INVENTION

The present invention proposes to remedy the above-mentioned drawbacks with a device for controlling the quantity of air fed to the intake of a charged internal combustion engine, which allows all the power demands of the engine to be fulfilled. Furthermore, the embodiment of the present invention is limited to modifications of the engine cylinder head, which minimizes its impact to the environment of the engine. The conventional compressed air loop is not modified.

The invention presented here also allows a transfer of the compressed air from the intake to the exhaust even when the mean pressure of the compressed air at the intake is lower than that of the exhaust gases. It is sufficient merely for phases to exist during the engine operating cycle in which the pressure at the intake is higher than that at the exhaust.

To this end, the present invention concerns a device for controlling the amount of air fed into the intake of a charged internal combustion engine, the engine comprising two exhaust gas outlets each connected to an exhaust manifold of a group of at least one cylinder, the device comprising a charging device comprising a turbocompressor having a dual-inlet turbine connected to the exhaust gas outlets and an external air compressor, and at least one duct for partially transferring compressed air from the compressor to the turbine inlets, characterized in that the partial transfer duct is built into the cylinder head of the engine between an intake and an exhaust connected to the turbine inlets, and has throttling means for controlling the circulation of transferred compressed air.

The partial transfer duct may comprise a non-return flap.

The device may comprise at least two partial transfer ducts integrated into the cylinder head and connected to two exhaust outlets of said cylinder head in communication with the two turbine inlets.

The partial transfer duct may connect the intake and exhaust of a same cylinder.

The partial transfer duct may connect the intake of one cylinder and the exhaust of another cylinder.

The throttling means may comprise proportional valves.

The device may comprise means for controlling the proportional valves.

The invention also concerns a method for controlling the amount of compressed air fed into the intake of a charged internal combustion engine, the engine comprises two exhaust gas outlets each connected to an exhaust manifold of a group of at least one cylinder, the device comprising a charging device with a turbocompressor having a dual-inlet turbine connected to the exhaust gas outlets and an external air compressor, and at least one duct for partially transferring compressed air from the compressor to the turbine inlets including positioning the duct in the cylinder head of the engine between an intake and an exhaust connected to the turbine inlets, and introducing part of the compressed air leaving the compressor via the at least one duct into the exhaust gas turbine inlets.

The method may position at least two transfer ducts in the cylinder head and control the circulation of compressed air in each of the ducts by throttling.

BRIEF DESCRIPTION OF THE DRAWINGS

Other characteristics and advantages of the invention will appear from reading the description below, which is given purely for illustrative purposes and is not limitative, and to which the following drawings are attached:

In FIG. 1, the internal combustion engine 10 comprises at least two cylinders with four cylinders being referenced $12_1$ to $12_4$ from the left of the figure.

Preferably, the engine is a direct-injection internal combustion engine, in particular of the diesel type, but this in no way excludes any other type of internal combustion engine.

Figure 1:
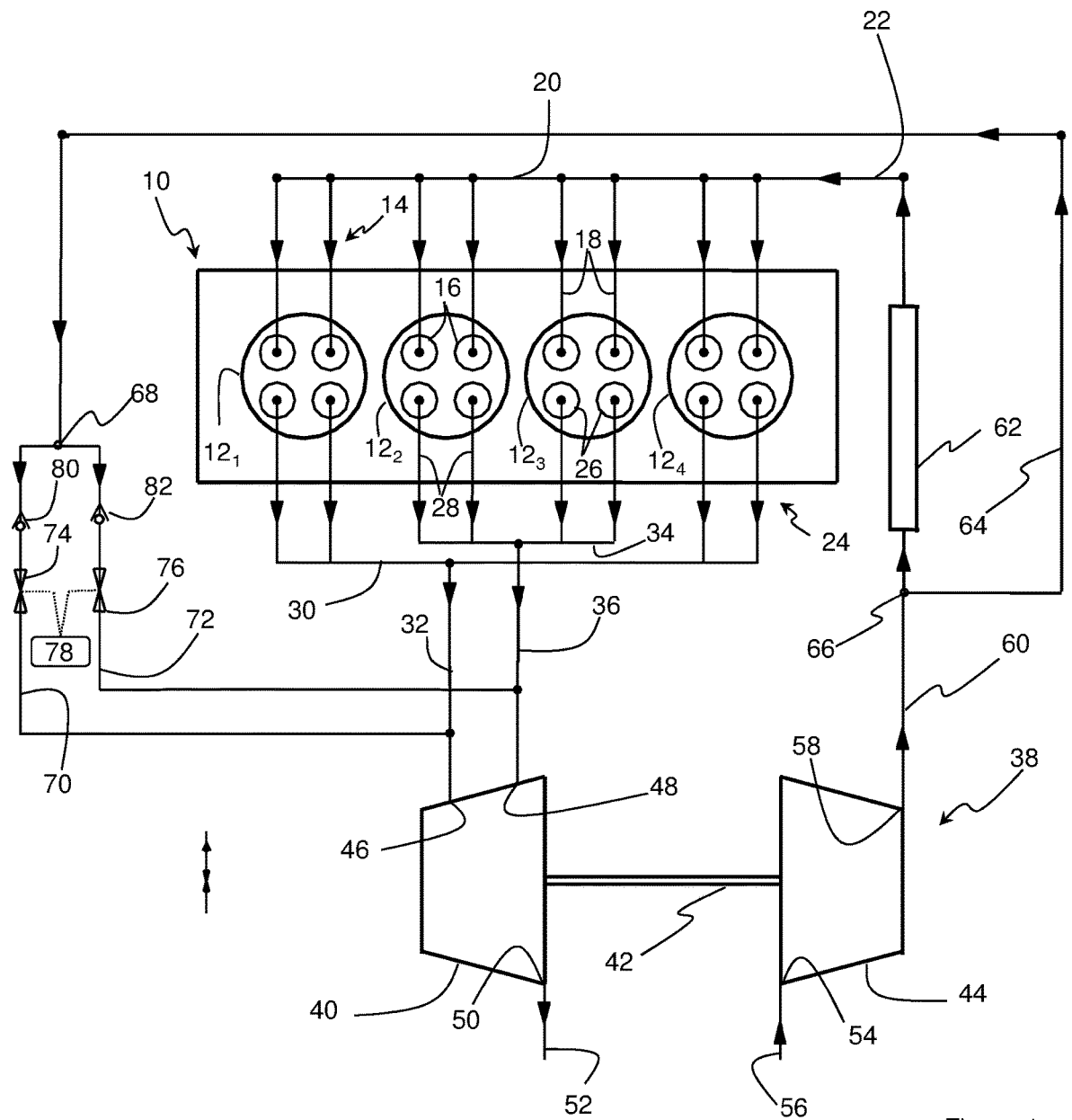
FIG. 1 which illustrates an internal combustion engine with a diagrammatic representation of the principle of the charging device according to the invention.

In FIG. 1, each cylinder 12 comprises an intake 14 having at least one intake valve 16 with two intake valves being illustrated. The individual valves 16 respectively control an individual tube 18. The intake tubes 18 are connected to an intake manifold 20 which is supplied with compressed intake air from intake duct 22.

This cylinder also comprises exhaust 24 for the combusted gases with at least one exhaust valve 26. Two valves each control one exhaust tube 28.

In the example illustrated in FIG. 1, the engine functions with a firing sequence of 1-3-4-2. In view of this firing sequence, the exhaust tubes of the first cylinder $12_1$ and the second cylinder $12_4$, which form a first group of at least one cylinder, are connected to a first exhaust manifold 30 with a first exhaust gas outlet 32. The exhaust tubes of the third and fourth cylinders $12_2$ and $12_3$, which form a second group of at least one cylinder, are connected to a second exhaust manifold 34 which comprises a second exhaust gas outlet 36.

The two exhaust gas outlets 32 and 36 lead to a turbocompressor 38 for compressing the air, and more particularly to the expansion turbine 40 of this turbocompressor.

As illustrated in FIG. 1, the turbocompressor 40 is a dual-inlet turbocompressor, better known as a twin scroll turbocompressor.

This type of turbocompressor comprises the expansion turbine 40 swept by the exhaust gases, which is connected to rotate a shaft 42 to drive compressor 44.

At the turbine, the inlet of the exhaust gases is divided into two sections. A first inlet section 46 is connected to the first exhaust gas outlet 32 of the first manifold 30 and a second inlet section 48 is connected to the second exhaust gas outlet 36 of the second exhaust manifold 34.

The evacuation of the gases 50 from the turbine 40 is conventionally connected to the exhaust pipe 52 of the engine.

The compressor 44 of the turbocompressor 38 comprises an external air intake 54 supplied by an intake pipe 56. The compressed air outlet 58 of this compressor is connected to the intake duct 22 of the intake manifold 20 by a pipe 60.

Advantageously, a cooling radiator 62 for the compressed air may be placed on the pipe 60 between the compressor and the duct 22.

As best shown on FIG. 1, a transfer duct 64 allows circulation of part of the compressed air leaving the compressor 44 towards the intakes 46 and 48 of the turbine.

This configuration shown in FIG. 1 better illustrates the principle of the invention by clearly describing the different compressed air circuits. However, when the present invention is produced according to FIG. 2, the scavenging ducts are arranged in the engine cylinder head.

According to FIG. 1, the partial transfer duct starts on the pipe 60 at an intersection point 66 between the compressor and the cooling radiator 62, and then separates from a branch point 68 into two branches 70 and 72. The branch 70 leads to the inlet 46 of the turbine via its junction with the first exhaust gas outlet 32 and the branch 72 leads to the other inlet 48 of the turbine via its junction with the exhaust gas outlet 36.

Each branch comprises throttles 74 and 76, such as a proportional valve, controlled by a control 78 which may be common to both throttles. This valve controls the circulation of compressed air circulating in the branch.

Advantageously, each branch also comprises non-return flaps 80 and 82 which prevents the circulation of compressed air from the branch to the compressor by preventing the communication of the two branches.

This configuration therefore allows, during operation of the engine, the benefit of exhaust zones of low pressure prevailing locally in the exhaust manifold, in order to introduce compressed air into the turbine and thus increase the flow of this turbine and consequently of the compressor. This also allows a more effective charging at low rotation speeds.

During operation, if large quantities of air are required in the cylinders, valves 74 and 76 are commanded to open in order to introduce compressed air from the compressor 44 into the turbine 40.

The compressed air leaving the compressor 44 circulates in the duct 64 and then in the branches 70 and 72 opening into the exhaust gas inlets 46 and 48 of the turbine 40, bringing a surplus of fluid to this turbine.

Thus, not only do the exhaust gases from outlets 30 and 36 pass through the turbine, but also compressed air which is added to this gas. Therefore, the rotation of the turbine is increased, which leads to an increase in rotation of the compressor and consequently an increase in pressure of the compressed air leaving this compressor.

Naturally, valves 74 and 76 are controlled by the control 78 to deliver the quantity of compressed air to the turbine which meets the charging needs of the engine.

Figure 2:
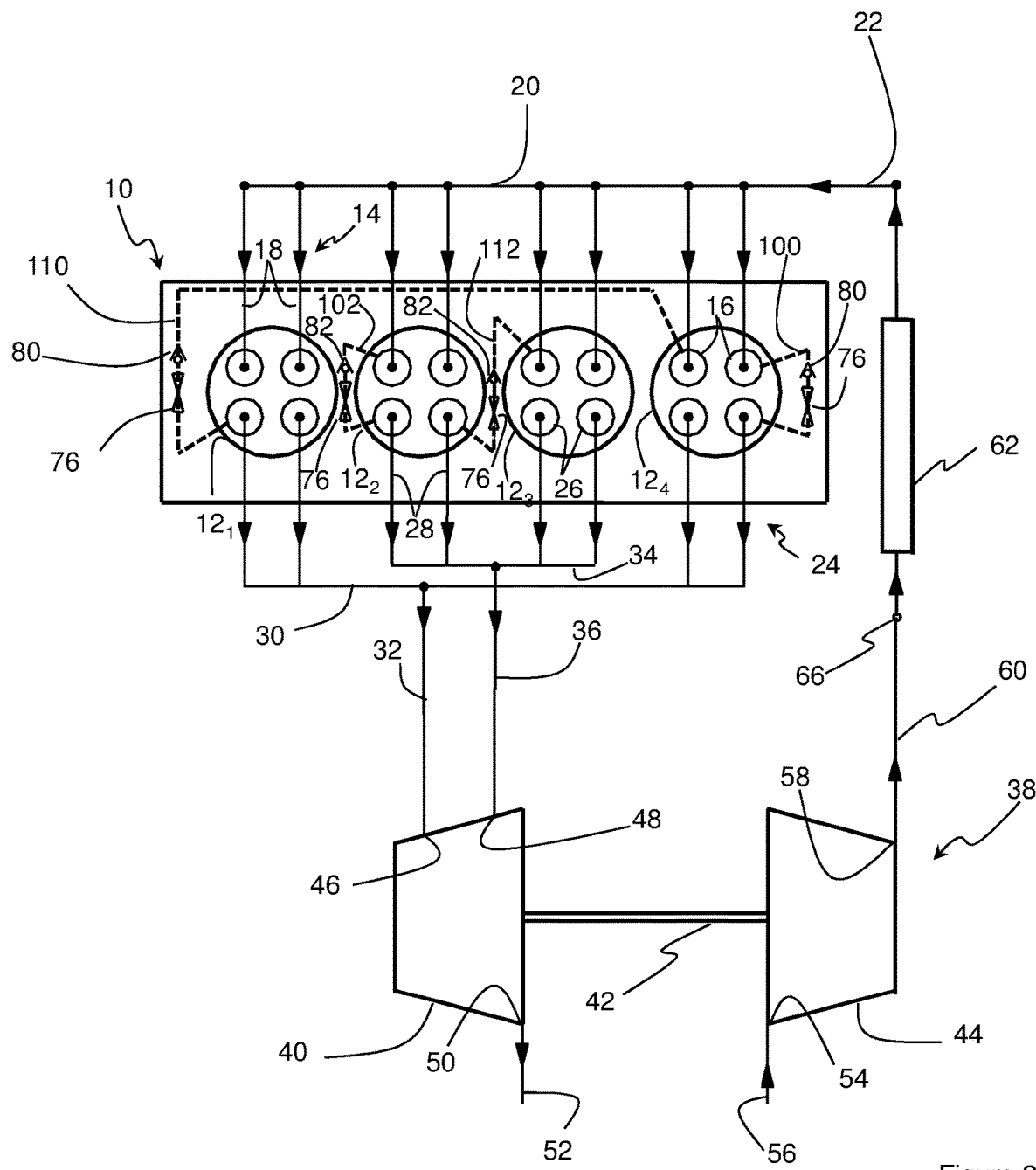
FIG. 2 which shows more precisely an embodiment of the internal combustion engine with its charging device comprising a transfer duct incorporated in the cylinder head.

FIG. 2 describes an exemplary embodiment of the invention. Here, the compressed air loop at the engine intake is not modified between the outlet of the compressor 38 and the intake tubes 18 of the manifold 20. Also, the exhaust loop is not modified, in particular with respect to the part supplying the turbine 14.

The present invention entails incorporation of partial transfer ducts for compressed air integrated into the body of the engine cylinder head.

Thus at piston 124, a partial transfer duct 100 connects the duct of the cylinder head into which the intake tube opens, to the exhaust duct at the cylinder head. This partial transfer duct contains a valve 74 for controlling the flow of air, and a non-return flap 80 to prevent the back flow of exhaust gases to the intake. This flap may be arranged upstream or downstream of the valve or even integrated in the valve 76.

This arrangement allows the introduction of compressed air from the compressor 44 to the inlet 46 of the turbine 40 through the cylinder 12₄.

Advantageously, another partial transfer duct 102 may be provided at the piston 12₂, which connects the duct of the cylinder head into which the intake tube opens, to the exhaust duct. A valve 76 is provided on this partial transfer duct for controlling the flow of air, and a non-return flap 82 to prevent the back flow of exhaust gas to the intake.

This arrangement allows the introduction of compressed air from the compressor 44 to the inlet 46 of the turbine 40 through the cylinder 12₁.

In a variant, from piston 12₃, another partial transfer duct 102 connects an intake to the exhaust duct of piston 12₂. Thus, the partial transfer of compressed air opens into the exhaust tube 34 which feeds the inlet 48 of the turbine 40. Like the transfer duct 100, the duct 102 is equipped with a flow control valve 76 and a non-return flap 82.

Also, another partial transfer duct 110 may be provided at piston 12₄, which connects an intake to the exhaust duct of piston 12₁. This other duct is equipped with a valve 76 and a non-return flap 82. In this case, the partial transfer of compressed air opens into the exhaust tube 30 which feeds the inlet 46 of the turbine 40.

As has been described with reference to FIG. 1, a control is connected to all control valves, so that the compressed air flows injected via the partial transfer ducts can be synchronized.

The embodiments are not limited to those exemplified in FIG. 2. Other equivalent configurations of transfer ducts in the cylinder head may be considered, in particular depending on the type of cylinder head or engine.

It is thus possible to provide the system either on all ducts (then requiring one system per duct) and on all cylinders (then requiring one system per duct and per cylinder), or on a limited number of ducts and/or cylinders.

It is also possible to group the ducts of the same cylinder or several cylinders if the size of the cylinder head allows, or to cross the ducts between cylinders so as to maximize the short-circuited flows.

In all cases, the flaps may be arranged upstream or downstream of the valve or integrated in the valve.

The partial transfer ducts may be created at the same time as casting of the cylinder head with space reserved for the throttling equipment, or by machining of the ducts after production of the cylinder head.

Naturally, a mixed embodiment is also possible.

It remains within the scope of the present invention if the partial transfer ducts integrated in the cylinder head are produced by tubes arranged on the cylinder head and connected to the intake duct and the exhaust duct as described above, insofar as the device is integrated between the intake and exhaust manifolds, that is without affecting the conventional intake loop and exhaust loop.

The invention claimed is:

1. A system for controlling a turbocharged internal combustion engine, the engine having a cylinder head, an intake, an exhaust manifold including two exhaust gas outlets respectively coupled to a different group of cylinders with each group containing at least one cylinder, comprising:

a turbocharger including a turbine with two turbine inlets with each inlet being connected respectively to a different one of the two gas outlets, the turbine driving an air compressor for producing compressed air which is fed to the intake of the engine;

at least one partial transfer duct built into the cylinder head of the internal combustion engine for partially transferring the compressed air from the air compressor to the turbine intakes; and at least one throttle located in the at least one partial transfer duct in the cylinder head for controlling the circulation of the compressed air flowing from the compressor through the at least one partial transfer duct into the turbine intakes; and wherein each cylinder comprises at least one intake valve and at least one exhaust valve.

2. The system of claim 1 wherein the at least one partial transfer duct comprises a non-return flap.

3. The system of claim 1 wherein at least two partial transfer ducts are integrated into the cylinder head and are connected to the two exhaust outlets of the cylinder head in communication with the two turbine inlets.

4. The system of claim 1 wherein the at least one partial transfer duct connects the intake of the cylinders and an exhaust duct of a single cylinder.

5. The system of claim 1 wherein the at least one partial transfer duct connects and air intake of one cylinder of another cylinder.

6. The system of claim 1 wherein each throttle comprise a proportional valve.

7. The system of claim 6 comprising a control for controlling each proportional valve.

8. A method for controlling a turbocharged internal combustion engine, the engine having a cylinder head, an intake, an exhaust manifold including two exhaust gas outlets respectively coupled to a different group of cylinders with each group containing at least one cylinder with each cylinder including at least one intake valve and at least one exhaust valve, a turbocharger including a turbine with two turbine inlets with each inlet being connected respectively to a different one of the two gas outlets, the turbine driving an air compressor for producing compressed air which is fed to the intake of the engine comprising:

building the at least one partial transfer duct into the cylinder head between an intake duct in the cylinder head of the engine and the exhaust outlets in the cylinder head; and introducing part of the compressed air leaving the compressor via the at least on partial transfer duct in the cylinder head into the turbine inlets by controlling the compressed air leaving the compressor flowing through the at least one partial transfer duct with a throttle located in each partial transfer duct in the cylinder head.

9. The method as claimed in claim 8 comprising positioning at least two partial transfer ducts in the cylinder head and controlling the circulation of compressed air in each of the at least two partial transfer ducts with the throttle located therein.

* * * * *